Patented Sept. 22, 1942

2,296,370

UNITED STATES PATENT OFFICE 2,296,370

ALKYLATION PROCESS

Ober C. Slotterbeck, Clark Township, Union County, N. J., assignor to Standard Oil Development Company, a corporation of Delaware No Drawing. Application December 15, 1939, Serial No. 309,405

15 Claims. (Cl. 196—10)

The present invention relates to the production of normally liquid saturated hydrocarbons of acyclic character by reacting branched-chain paraffinic hydrocarbons with olefinic hydrocarbons, in the presence of a novel alkylation catalyst.

Numerous catalysts have been proposed for promoting alkylation reactions of this type. Among the known catalysts are aluminum chloride, sulfuric acid, phosphoric acid, various acid-activated clays, etc. However, in most instances it has been found that it is necessary to use large quantities of the catalyst in order to carry out alkylation processes efficiently. Furthermore, many of the catalysts have the disadvantage of rapidly degrading during the alkylation process. A further disadvantage of the catalysts previously employed for this kind of reaction has been the fact that the rate of their degradation during the course of the reaction increases considerably when the reaction is carried out at elevated temperatures. Although the rate of alkylation is increased at elevated temperatures, this advantage is offset by the catalyst deterioration so that it has been necessary when employing the catalysts of the prior art to operate at relatively low temperatures, that is in the neighborhood of room temperature or slightly above. Of necessity, this involved the tying up of alkylation equipment for a relatively long unit of time per unit of alkylate yield.

It has now been found that, by employing a novel alkylation catalyst, more fully described hereinafter, the disadvantages inherent in the use of the previously known catalysts have been obviated and improved yields of highly desirable alkylation products may be obtained without the disadvantage of appreciable catalyst degradation or the necessity of employing large volumes of the catalyst with respect to the volume of feed present in the reactor at any one time. In contrast to sulfuric acid, which has heretofore been commonly employed as an alkylation catalyst, and which is known to be an oxidizing agent under the conditions employed in carrying out alkylation reactions, the present catalyst has the distinct advantage of having no oxidizing effect on the reactants or products of the alkylation reaction. This advantage is directly coupled with the fact that the amounts of catalyst required to efficiently promote an alkylation reaction are far less in the case of the present catalyst than in the cases of previously known catalysts, since its degradation due to any oxidizing effect is substantially completely eliminated.

Catalysts prepared by passing boron fluoride into water at room temperature or slightly above are known to promote alkylation reactions. However, the novel catalyst is prepared from water, boron fluoride, and hydrogen fluoride.

It is an object of the present invention to alkylate isoparaffins with olefins to produce saturated normally liquid hydrocarbons boiling within the gasoline range.

It is a further object of the present invention to carry out such an alkylation reaction in the presence of the herein described novel alkylation catalyst.

Other objects will be apparent to those skilled in the art from the following disclosure.

The objects of this invention are accomplished by contacting paraffinic hydrocarbons containing at least one tertiary carbon atom per molecule with mono-olefins under alkylating conditions in the presence of the catalyst prepared from water, boron fluoride, and hydrogen fluoride as herein described.

The exact nature of the catalyst is not known and it is believed that its composition varies to some extent, depending upon the specific method by which it is formed. It is to be distinctly understood that the present invention is not limited by any theory regarding the reaction or by any theory as to the actual catalytic constituents. In effecting the process of the present invention, it is only necessary that the catalyst be composed of water, boron fluoride, and hydrogen fluoride. The catalyst employed in the present process is known to be distinct and different from the so-called hydroxyfluoboric acid compounds prepared according to the processes outlined in Sowa et al., Journal of American Chemical Society, volume 57, pages 454 through 456.

The novel catalysts can be prepared by saturating an aqueous solution of hydrogen fluoride with boron fluoride at room temperature or slightly above. The catalyst may be prepared in a less efficacious form by introducing hydrogen fluoride into a saturated aqueous solution of boron fluoride and removing the precipitate therefrom. The preferred preparative procedure, however, is as indicated in the first instance. No precipitate is formed by this process unless the precentage of hydrogen fluoride in the composition is greater than 18%, and the resulting catalyst appears to be more effective with respect to promoting alkylation reactions than does the catalyst prepared according to the latter procedure. The preferred catalyst may be prepared as follows: a mixture of 25 grams of water and 100 grams of 48% hydrofluoric acid is saturated at room temperature with boron fluoride. This catalyst contains 12.2% of hydrogen fluoride; by varying the concentration of the aqueous hydrogen fluoride, the final catalyst composition may be made containing between about 1% and about 20% of hydrogen fluoride.

Depending upon the concentration of hydrogen fluoride present in the novel catalyst, its freezing point varies between about −20° C. and about +23° C. Dihydroxyfluoboric acid, on the other hand, does not crystallize at temperatures as low as −20° C.

The temperatures employed in carrying out the process of the present invention may range from a point just above the freezing point of the catalyst composition to about 150° C. or even higher. However, at the higher temperatures, it is advantageous to employ superatmospheric pressures in order to maintain the reactants and catalyst in the liquid phase, since it had been found that efficient contacting of the constituents of the reaction mixture with each other is conducive to higher yields of alkylate. Such contacting is more easily accomplished by intensive agitation when the reactants and catalyst are in the liquid phase. The time of reaction may vary between about 3 minutes and about 2.5 or 3 hours, depending upon the temperature employed. At high operating temperatures, the rate of conversion is considerably higher than at low temperatures. Therefore, the contact time could feasibly be adjusted so that a shorter time of contact would be employed for reactions carried out at the higher temperatures and a longer time of contact for reactions carried out at the lower temperatures. It is ordinarily satisfactory to use reaction times of between about 10 and about 60 minutes.

It is contemplated to carry out the reaction in either the liquid or the vapor phase, although, for commercial operation, it is preferred to employ superatmospheric pressures at least sufficient to maintain the reacants and catalyst in the liquid phase. Pressures of between about 1 and about 100 atmospheres may be employed. However, under the preferred conditions of operation, pressures of between about 3 and about 10 atmospheres are sufficient when employing ordinary refinery hydrocarbon feed stocks, for example, refinery $C_4$ cut containing isobutane and butylenes.

It has been found to be desirable to maintain a substantial excess of the paraffin containing at least one tertiary carbon atom per molecule in the reaction zone. When isobutane and isobutylene are employed, the molar ratio of these two reactants may range from between about 1:1 to about 30:1. However, the molar ratio of isoparaffin to olefin is preferably maintained between about 2:1 and about 10:1, because better yields of product are obtained under these conditions.

The process of the present invention may suitably be carried out in any apparatus which has heretofore been employed for polymerization or alkylation processes, such as, for example, those employed when using concentrated sulfuric acid as the catalytic agent. The catalyst of this invention is liquid under the conditions of reaction and immiscible with the hydrocarbon reactants and products. Conventional settling tanks may therefore be employed in commercial units for separating the partially spent catalyst from the product. Such catalytic material may then be returned to the alkiation reactor, as in the case of sulfuric acid alkylation processes.

As in the case of alkylation processes catalyzed by concentrated sulfuric acid, it is desirable when employing the water-boron fluoride-hydrogen fluoride catalyst composition as an alkylation catalyst to recycle to the alkiation zone the undesired by-products of the reaction. Thus, when a product consisting of a $C_6$—$C_9$ hydrocarbon fraction is desired, any unreacted hydrocarbons as well as the lower boiling products of the reaction, that is, those products boiling below the initial boiling point of the $C_6$ fraction, and the higher boiling products, that is, those products boiling above the final boiling point of the $C_9$ fraction, may be separated by fractional distillation or other suitable means from the desired products and returned in whole or in part to the original alkylation zone in order to materially increase the yields (based upon the fresh mono-olefins and fresh isoparaffins fed to the alkylation unit) of the desired products.

It is preferred to use isobutane and/or mixtures containing isobutane as the paraffinic reactant because of high octane number in the products produced therefrom. However, other branched-chain paraffinic hydrocarbons, such as isopentane and higher homologues thereof containing at least one tertiary carbon atom per molecule, may be employed as paraffinic reactants. The higher homologues are especially desirable as reactants when it is desired to produce safety fuels. Mixtures of two or more of these isoparaffinic hydrocarbons which may contain straight-chain paraffins may be employed in alkylation feed stocks. It is unnecessary to separate out straight-chain paraffinic hydrocarbons from the branched-chain paraffinic hydrocarbons prior to their introduction into the alkylation unit, since their presence is not detrimental to the formation of the desired products.

As olefinic constituents, ethylene, propylene, normal butylenes, isobutylene, trimethylethylene, pentenes, and higher mono-olefin hydrocarbons having either straight-chain or branched-chain structures, as well as their interpolymers, crosspolymers or copolymers, such as diisobutylene, triisobutylene, the codimer of normal butylene and isobutylene, etc., may be employed. Mixtures of two or more of these olefins are suitable for use in feed stocks for alkylation in the presence of the novel catalyst.

Petroleum hydrocarbon compositions containing both isoparaffins and mono-olefins such as refinery $C_3$, $C_4$, and/or $C_5$ cuts, field butanes which have been subjected to isomerization and partial dehydrogenation treatments, refinery stabilizer bottoms, spent gases and liquid bottoms from catalytic polymerization and copolymerization processes, are excellent feed stocks for the process of the present invention.

The present process may be carried out either in batch or continuous fashion, although it is preferred to carry out same continuously. It has been found that the more intimate the contact between the feed stock and the catalyst, the better the yield of saturated products. In the case of batch operations, mechanical stirrers or shakers provide adequate agitation. In the case of continuous operations, the use of turbo mixers, the introduction of the feed into the reactor through jets of restricted internal diameter or porous thimbles, or the like results in ample agitation of the reaction mass.

The novel catalyst gradually becomes less effective for promoting the alkylation reaction as its length of service increases. This is partially due to a gradual dilution of the catalyst by water introduced in small amounts with the hydrocarbon feed, and high molecular weight hydrocarbons, which do not readily separate from the catalyst during the ordinary operation of the process. The catalyst concentration may be maintained to some extent by the addition of small amounts of hydrogen fluoride and/or boron fluoride, either continuously or intermittently, to the catalyst composition as it is being returned to the alkylation zone from the catalyst-hydrocarbon settler. However, after prolonged usage, the catalyst composition becomes degraded to a point where its catalytic activity is quite low. When such a stage of catalyst activity has been reached, the spent catalyst is subjected to a regeneration treatment. In this treatment, the catalyst is diluted with water until the high molecular weight hydrocarbons separate out as a distinct hydrocarbon layer. This supernatant layer is then decanted from the aqueous solution and discarded. The aqueous solution may then be subjected to one of two procedures. The excess water may be removed from the catalyst by a physical means, such as distillation or solvent extraction, a chemical means such as the use of dehydrating agents. If the excess water is removed by distillation, care should be exercised not to reduce the water content of the catalyst to such a point that appreciable quantities of catalyst constituents other than water are to be found in the distillate. However, the preferred procedure for regenerating the catalyst involves the addition of an amount of hydrogen fluoride to the catalyst layer sufficient to bring the hydrogen fluoride content of the catalyst up to its original value, and a subsequent similar addition of boron fluoride. Such a procedure is more preferable than one involving the addition of boron fluoride followed by the addition of hydrogen fluoride, or a procedure wherein hydrogen fluoride and boron fluoride are added simultaneously to the catalyst layer.

A modified procedure for the regeneration of the catalyst embodies a partial removal of the excess water by either mechanical or chemical means and the subsequent addition of hydrogen fluoride followed by the addition of boron fluoride to the catalyst layer. Such a combined procedure is employed when it is desired to maintain the volume of regenerated catalyst constant with respect to the volume of spent catalyst withdrawn from the alkylation system.

As illustrative of the mode of carrying out the process of the invention but not with any intention of restricting the invention thereto, the following examples are given:

Example 1

A saturated solution of boron fluoride in water was prepared; to 84 grams of this saturated solution there were added 15 grams of anhydrous hydrogen fluoride. 100 grams of this catalyst composition were mixed with 300 grams of isopentane. To this mixture there were added with agitation 50 grams of diisobutylene over a period of about 25 minutes, the reaction mixture being maintained at a temperature of between about 20° and 25° C. The agitation was continued for an additional 35 minutes after the completion of the diisobutylene addition. At the end of this time, the hydrocarbon layer was withdrawn from the reactor and distilled to yield 73 grams of alkylate boiling above 40° C. This corresponds to about a 146 weight per cent yield (based on the olefin added in the feed) of a $C_6$ and heavier product.

In the following examples, the catalyst composition was prepared according to the preferred procedure, that is, the boron fluoride was added to a water-hydrogen fluoride mixture.

Example 2

The catalyst was prepared as follows: 50 grams of 48% aqueous hydrogen fluoride were added to 100 grams of water. This solution was completely saturated with boron fluoride. The catalyst then contained 73.8% of boron fluoride and 4.4% of hydrogen fluoride, the remainder being water.

To a mixture of 430 cc. of isopentane and 250 cc. of the above-described catalyst composition there were added 80 cc. of diisobutylene with intensive agitation over a period of about 35 minutes, the reaction mixture being maintained at a temperature of from about 20° to 25° C. The molar ratio of isopentane to diisobutylene in the reaction mixture was about 3 to 1. After the addition of the olefin was completed, the reaction mixture was intensively agitated for an additional 25 minutes. 122 grams of hydrocarbon product, boiling above 40° C., and containing hydrocarbons having at least 6 carbon atoms per molecule, were obtained. This corresponded to about a 218 weight per cent yield, based on the olefin added to the reaction mixture.

Under substantially identical conditions, except that a more efficient stirring was effected, the yield of the $C_6$ and heavier alkylate was increased to 131 grams, which corresponded to about a 234 weight percent yield, based on the olefin added to the feed.

Example 3

A series of comparative runs was made to determine the effect of varying the amount of hydrogen fluoride in the catalyst composition. The following standard procedure was employed for these runs:

Isopentane and diisobutylene were used in a 3:1 volume ratio; 55 volume per cent of catalyst, based on the hydrocarbon charge, was employed; the diisobutylene was added to the isopentane catalyst mixture, the latter being vigorously agitated, over a period of 40 minutes; the intensive agitation of the reaction mixture was continued for an additional 80 minutes so as to insure completion of the reaction. The following table discloses the yields of alkylate, based on the total olefin in the feed obtained when using catalyst compositions containing various percentages of HF:

| Temp., °C. | HF in catalyst | Melting point of catalyst | Total time of contact | Weight of yield of alkylate |
|---|---|---|---|---|
| | Per cent | °C. | Hours | |
| 20–25 | 9.7 | −10 | 2 | 195 |
| 20–25 | 4.7 | −15 | 2 | 210 |
| 20–25 | 16.5 | +23 | 2 | 188 |
| 20–25 | 0 | +3 | 2 | 178 |

The last run was made using a catalyst composition consisting of a completely saturated aqueous solution of $BF_3$. This composition contained 78.5% of $BF_3$ and 21.5% of water.

In view of the above data, it is believed that it is necessary, when employing catalyst compositions containing high concentrations of HF to decrease the time of contact of the hydrocarbons with the catalyst and also to decrease the proportion of catalyst to total hydrocarbons in the mixture in order to avoid or overcome substantial cracking of the desired alkylate.

Example 4

The following data illustrate the point that, when employing a catalyst composition containing a low concentration of HF, it is desirable to increase the proportion of catalyst to hydrocarbons in order to obtain the alkylate product in high yields: when operating under the conditions described in Example 3 and using a catalyst composition containing 4.7% of HF, about a 210 weight per cent yield of alkylate was obtained. Upon using about 27.5 volume per cent of the same catalyst, based on the total hydrocarbon, in an alkylation reaction carried out under otherwise identical conditions, the alkylate yield, based upon the total olefin, was about 178 weight per cent.

Example 5

The following experiments were run to determine the most effective temperature range in which to carry out alkylation reactions in the presence of the novel catalyst. The other operating variable were held substantially constant; the catalyst composition contained about 18% HF; the reactants, isopentane and diisobutylene, were used a 3:1 volume ratio; the reaction mixture contained about 20 volume per cent of catalyst, based on the total hydrocarbon. The reactants and catalyst, in the above proportions, were introduced into an autoclave, which was vigorously shaken for about 1 hour at a temperature of, in one case, about 60° to about 65° C., and, in another, about 100° to 106° C. The yields of $C_6$ and heavier alkylate, based on the total olefin, were 152 weight per cent and 192 weight per cent, respectively. In view of these data, it is considered that still better yields could be obtained at these higher temperatures if the HF concentration of the catalyst were reduced to between about 5 and about 10%, since, undoubtedly, some cracking of the desired product occurred in these runs. It is also evident from these data that better yield can be obtained by employing a semi-batch operation, as was done in the previous examples, or continuous operation in contrast to a purely batch operation.

Example 6

A mixture of isopentane and about 55 volume per cent (based on the total hydrocarbon to be present in the reaction mixture) of a catalyst composition containing about 9.7% HF was prepared. Sufficient diisobutylene was added to this mixture over a 40 minute period at a temperature of about 20–25° C. to effect a 3:1 final volume ratio of isopentane to dissobutylene. In one run, in which the vigorous agitation of the reaction mixture was continued for a period of 20 minutes after the completion of the olefin addition, a 184 weight per cent yield of $C_6$ and heavier alkylate, based on the total olefin in the reaction mixture, was obtained. Under identical conditions, except that the vigorous agitation of reaction mixture was continued for a period of 80 minutes after the completion of the olefin addition, a 195 weight per cent yield of $C_6$ and heavier alkylate was obtained. These experiments were conducted as semi-batch processes. Undoubtedly, operation of this process in a commercial continuous unit would result in substantially increased alkylate yields; also, the time of contact of the reactants with the catalyst under the alkylation conditions would be of somewhat less importance, since it is generally known that better agitation can be effected in commercial units than in relatively small-scale laboratory units.

Having described fully the invention and having set forth the nature and objects of the invention and illustrated the same, what is claimed as new and useful and desired to be secured by Letters Patent is:

1. A process for the production of normally liquid saturated hydrocarbons which comprises reacting at least one paraffinic hydrocarbon containing at least one tertiary carbon atom per molecule with at least one olefinic hydrocarbon under alkylation conditions in the presence of a catalyst composition prepared only from HF, $H_2O$, and $BF_3$.

2. A process as in claim 1 wherein the operating temperature is between about the freezing point of the reaction mixture and about 175° C. and the reaction time is between about 3 minutes and about 2.5 hours.

3. A process as in claim 1 wherein the operating temperature is between about the freezing point of the reaction mixture and about 175° C., the reaction time is between about 3 minutes and about 2.5 hours, superatmospheric pressures sufficient to maintain the reaction mixture in the liquid phase are employed, and the reaction mixture is vigorously agitated during the reaction.

4. A process as in claim 1 wherein the operating temperature is between about the freezing point of the reaction mixture and about 175° C., the reaction time is between about 3 minutes and about 2.5 hours, and the molar ratio of the paraffinic component to the olefinic component of the reaction mixture is greater than one.

5. A process for the production of normally liquid saturated hydrocarbons which comprises reacting at least one paraffinic hydrocarbon containing at least one tertiary carbon atom per molecule with at least one monoolefinic hydrocarbon under alkylation conditions in the presence of a catalyst composition prepared by saturating an aqueous hydrogen fluoride solution with boron fluoride at about room temperature.

6. A process as in claim 5 wherein the paraffinic component contains isobutane.

7. A process as in claim 5 wherein the paraffinic component contains isopentane.

8. A process as in claim 5 wherein the reactants are a refinery $C_3$—$C_5$ cut containing branched-chain paraffins and mono-olefins.

9. A process as in claim 5 wherein the reaction is carried out continuously with vigorous agitation and under sufficient superatmospheric pressure to maintain the reaction mixture in the liquid phase.

10. A process as in claim 5 wherein the reaction is carried out continuously, the partially spent catalyst is removed at least intermittently from the alkylation system and is regenerated by diluting it with water, separating a hydrocarbon layer from the diluted catalyst, removing water therefrom and fortifying the concentrated catalytic material with HF and then $BF_3$ to substantially the original concentration, and the regenerated catalyst is introduced at least intermittently into the alkylation system.

11. A process as in claim 5 wherein the HF content of the catalyst composition is between about 4 and about 20%.

12. A process for the production of normally liquid saturated hydrocarbons which comprises reacting about 3 mols of isopentane with about one mol of diisobutylene with vigorous agitation at about room temperature for about one hour in the presence of a catalyst composition containing about 73.8% of boron fluoride, about 4.4% of hydrogen fluoride, and about 21.8% of water, and recovering a normally liquid saturated hydrocarbon mixture, the components of which contain at least 6 carbon atoms per molecule.

13. A process as in claim 12 wherein the operating temperature is about 100° C.

14. A process for the production of motor fuel constituents substantially completely saturated in character which comprises reacting a refinery $C_4$ cut, containing isobutane and butylenes, to which sufficient extraneous isobutane is added to give an isobutane:butylenes molar ratio of at least 2:1, at a temperature of between about —20° C. and about 100° C. with vigorous agitation for between about 0.1 and about 2 hours under sufficient superatmospheric pressure to maintain the reaction mixture in the liquid phase in the presence of a catalyst composition prepared by saturating an aqueous hydrogen fluoride solution with boron fluoride, said catalyst composition being present in an amount of between about 10 and about 100% by volume, based on the total hydrocarbons present in the reaction mixture at any one time, and recovering the desired motor fuel constituents from the alkylate.

15. A process as in claim 14 wherein the reaction is carried out continuously and at least a portion of the hydrocarbons boiling above and below the desired motor fuel fractions are recycled to the alkylation zone.

OBER C. SLOTTERBECK.